(12) United States Patent
Cooper et al.

(10) Patent No.: US 8,909,792 B2
(45) Date of Patent: Dec. 9, 2014

(54) METHOD, SYSTEM, AND COMPUTER PROGRAM PRODUCT FOR IDENTIFYING AND TRACKING SOCIAL IDENTITIES

(75) Inventors: Cameron Blair Cooper, Lakeway, TX (US); Algis Woss, Austin, TX (US)

(73) Assignee: Socialware, Inc., Austin, TX (US)

( * ) Notice: Subject to any disclaimer, the term of this patent is extended or adjusted under 35 U.S.C. 154(b) by 499 days.

(21) Appl. No.: 13/293,784

(22) Filed: Nov. 10, 2011

(65) Prior Publication Data

US 2012/0124202 A1    May 17, 2012

Related U.S. Application Data

(60) Provisional application No. 61/413,228, filed on Nov. 12, 2010.

(51) Int. Cl.
*G06F 15/16* (2006.01)
*G06F 17/30* (2006.01)

(52) U.S. Cl.
CPC ................... *G06F 17/30035* (2013.01)
USPC .......................................... 709/227

(58) Field of Classification Search
CPC ....... H04L 67/14; H04L 67/146; H04L 67/28; H04L 67/2804; H04L 67/2819
USPC .................................................. 709/227–228
See application file for complete search history.

(56) References Cited

U.S. PATENT DOCUMENTS

| | | | |
|---|---|---|---|
| 2009/0006861 A1* | 1/2009 | Bemmel ........................ | 713/189 |
| 2011/0055340 A1* | 3/2011 | Bautista ........................ | 709/206 |
| 2011/0238723 A1* | 9/2011 | Weintraub et al. ............. | 709/201 |
| 2012/0011223 A1* | 1/2012 | Rothschild .................... | 709/219 |

* cited by examiner

*Primary Examiner* — Jason Recek
(74) *Attorney, Agent, or Firm* — Sprinkle IP Law Group

(57) ABSTRACT

Embodiments disclosed herein provide a control logic that can identify and track social identities of users belonging to a private network. The control logic may be implemented as a middleware communicatively connected to network user devices and to social networking platforms. The middleware can programmatically identify and extract particular pieces of information from requests and/or responses monitored at a network proxy server and correlate the extracted pieces of information to identify social identities across social networking platforms. The correlated information for each identified social identity may be stored in an identity database as a cohesive user identity record. Information stored in the identity database can be used to consistently apply and enforce policies that are applicable to individual users in the private network.

12 Claims, 5 Drawing Sheets

US 8,909,792 B2

METHOD, SYSTEM, AND COMPUTER PROGRAM PRODUCT FOR IDENTIFYING AND TRACKING SOCIAL IDENTITIES

CROSS-REFERENCE TO RELATED APPLICATION(S)

This is a conversion of and claims a benefit of priority from U.S. Provisional Application No. 61/413,228, filed Nov. 12, 2010, entitled "METHOD, SYSTEM, AND COMPUTER PROGRAM PRODUCT FOR IDENTIFYING AND TRACKING SOCIAL IDENTITIES," which is fully incorporated herein by reference.

TECHNICAL FIELD

This disclosure relates generally to Web applications, including social networking applications. More particularly, this disclosure relates to a system, method, and computer program product for identifying and tracking social networking identities.

BACKGROUND

Advances in communications technology often change how people communicate and share information. More recently, social networking sites are providing new ways for users to interact and keep others abreast of their personal and business dealings. The growth of social networking sites is staggering. New sites are emerging daily and new users are joining in droves. Today, social networking sites are being used regularly by millions of people around the globe, and it seems that social networking via websites will continue to be a part of everyday life at least in the United States.

The main types of social networking services provided by social networking sites are those which contain directories or categories, a means to connect with friends, and a means to recommend other individuals. For example, a social networking site may allow a user to identify an individual as a friend, a former classmate, or an uncle. The social networking site may recommend to the user another individual as a potential friend and also provide a personalized web page for the user to interact with those that the user has identified as "friends" via the social networking site.

Some social networking sites provide functions in the form of Web applications for members to create user profiles, send messages to other members who are their "friends," and personalize Web pages available to friends and/or the general public. Through these Web applications, social networking sites can connect people at low cost and very high efficiency. Some entrepreneurs and businesses looking to expand their contact base have recognized these benefits and are utilizing some social networking sites as a customer relationship management tool for selling their products and services.

For businesses and entities alike looking to embrace social networking sites as an additional method to exchange information between employees, clients, vendors, etc., the integration of social networking sites into their internal computing environments necessarily raises several critical concerns. What activities will people be allowed to be engaged in? What information may be disclosed and to what extent? Who is the information being disclosed to? Is malicious or otherwise damaging material being accessed or allowed onto the business's computers? How can a business manage the activities of particular users or groups?

Currently, there are no viable solutions to these difficult questions as businesses do not have control over Web applications provided by independent entities, including social networking sites own and operated by such independent entities. Some businesses have the means to block traffic to and from social networking sites. Some businesses can only hope that their employees are only using these social networking sites in the best interest of the company. There is no guarantee that the employees may police their own access to and participation at social networking sites and there is always the concern of an employee knowingly or unknowingly posting confidential information on a social networking site. Because of these risks, many businesses simply choose to deny their employees access to uncontrolled Web applications and forgo the efficiencies and cooperative gains that may come from embracing social networking sites.

SUMMARY

Leveraging social network proxy and filtering technologies, embodiments disclosed herein can track social networking identities at an application level. Examples of suitable social network proxy and filter technologies can be found in U.S. patent application No. 12/562,032, filed Sep. 17, 2009, entitled "METHOD, SYSTEM, AND STORAGE MEDIUM FOR ADAPTIVE MONITORING AND FILTERING TRAFFIC TO AND FROM SOCIAL NETWORKING SITES," which is fully incorporated herein by reference.

Example embodiments can be implemented on a server computer communicatively connected to a user device and a social networking platform. The user device can be one of many user devices communicatively connected to the server computer. Likewise, the social networking platform can be one of many social networking platforms communicatively connected to the server computer. The user device can be associated with a user in a private network. The private network can have many users, each of which may have one or more user devices. The server computer can be a gateway computer, a network proxy, or any suitable machine configured to monitor user requests and/or web application responses.

A control logic implemented on the server computer can identify and extract particular pieces of information and correlate the extracted pieces of information to identify social identities (also referred to herein as social network identities) that are in communication with certain social networking sites (via web applications thereof). In some embodiments, the requests and the responses may conform to the HyperText Transfer Protocol (HTTP). In some embodiments, the correlated information for each identified social identity may be stored in an identity database as a cohesive user identity record. In one embodiment, the correlated information is consistent within each login session.

The control logic can be implemented as a middleware on the server computer. The middleware can be configured to perform a plurality of functions, including extracting a unique session value from a request sent by a browser application running on the user device and determining whether the unique session value contains a social identity. In embodiments disclosed herein, a social identity represents a unique user identity on a social network and may refer to a unique identifier used by the social network's underlying platform to identify the user on the social network, which is external to the private network. A user may have multiple social identities on a single social network.

In one embodiment, if the unique session value extracted from the request contains no social identity, the middleware may operate to parse a response to the request to attempt to extract a social identity from the response and match, associate, or otherwise correlate that social identity to the unique session value extracted from the request. The correlated information is then stored in an identity database.

In one embodiment, if a social identity is found in the unique session value extracted from the response, the middleware may operate to compare the social identity with social identities stored in the identity database. In one embodiment, if the social identity is found to be one of the social identities stored in the identity database, the middleware may operate to apply one or more policies to an activity requested by the user. Suppose the user is in a group of users in the private network, the one or more policies may be associated with the group of users and thus applicable to the user and the user's interaction with social networking platform(s).

In some embodiments, if the unique session value extracted from the request contains no social identity or if the social identity is not found in the identity database, the middleware may operate to cache a copy of the request and forward the request to a web application on the social networking platform. In one embodiment, if the unique identifier cannot be extracted from the response to the request, the middleware may operate to deny an activity requested by the user.

Embodiments can be useful in many applications. For example, since multiple social identities can be tracked to a single, unique user identity stored in an identity database, various policies, including archiving, moderation, access control, and so on, can be consistently and efficiently applied across these multiple social identities, even if these social identities exist on different social networking platforms. Moreover, by linking multiple social identities to a single, unique user identity, policies can now be applied at an application level.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Figure 1:
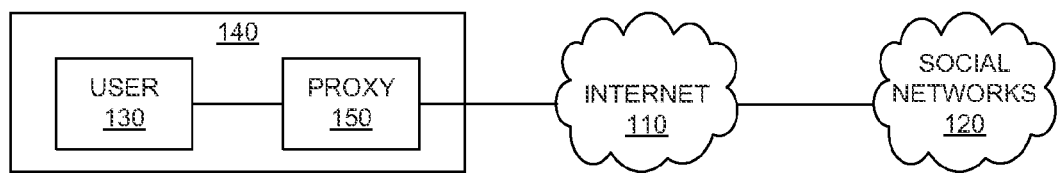
FIG. 1 depicts a simplified diagrammatic representation of a prior art architecture for network access control to social networking sites.

FIG. 1 depicts a simplified diagrammatic example of how traditionally an entity or organization may monitor and protect network traffic to and from social networking sites. In this example, Company A may own and operate company network 140. Examples of company network 140 may include a local area network (LAN), an intranet—a private computer network within the organization, etc. User 130 of company network 140 may access Internet 110 via proxy 150. Social networking sites 120 may be generally accessible by users connected to Internet 110. As an example, social networks 120 may include, but are not limited to, Facebook®, LinkedIn®, Twitter®, MySpace®, Friendster®, Multiply®, Orkut®, Cyworld®, Hi5®, and others. All trademarks, service marks, and logos used herein are properties of their respective companies.

In some cases, proxy 150 of company network 140 may monitor and block all network traffic to and from one or more social networking sites 120 by way of a firewall implemented on proxy 150. As known to those skilled in the art, a firewall may be implemented as a part of a computer system or network that is designed to block unauthorized access while permitting authorized communications. A firewall may be implemented as a device or a set of devices configured to permit, deny, encrypt, decrypt, or proxy all incoming and outing network traffic between different domains based upon a set of rules and other criteria. Firewalls may be implemented in hardware, software, or a combination of both. Firewalls are frequently used to prevent unauthorized Internet users from accessing private networks connected to the Internet, especially intranets. Generally, all messages entering or leaving the intranet pass through the firewall, which examines each message and blocks those that do not meet the specified security criteria.

Proxy 150 represents a server computer that acts as an intermediary for requests from user 130 seeking resources from other servers, including those that reside outside of network 140. Those skilled in the art can appreciate that user 130 is a representation of a typical user in company network 140 and may include software and hardware utilized by the user to access company network 140 and Internet 110.

Figure 2:
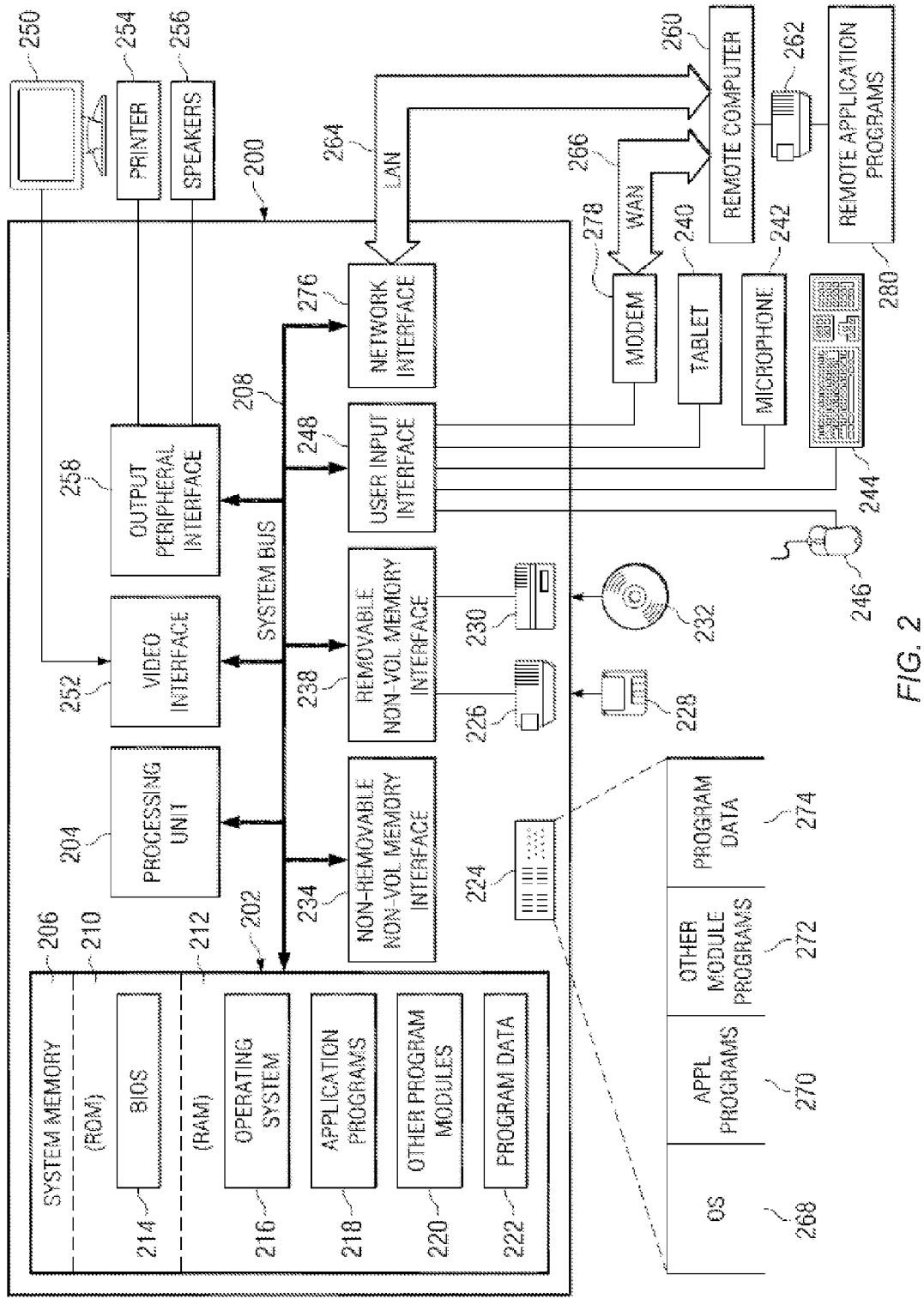
FIG. 2 depicts a diagrammatic representation of an exemplary computer system and network environment in which example embodiments disclosed herein can be implemented.

FIG. 2 depicts an exemplary system within a computing environment where embodiments disclosed herein may be implemented. For example, referring to FIG. 3, computing system 200 may implement proxy server computer 350 residing in company network 340. As another example, computing system 200 may be a client computer associated with user 330. As yet another example, computing system 200 may implement an embodiment of middleware 310 and be communicatively connected to proxy server computer 350. Middleware 310 can be implemented in the form of control logic in software or hardware or a combination of both.

Components 202 of computing system 200 may include, but are not limited to, processing unit 204, system memory 206, and system bus 208. System bus 208 may couple various system components including system memory 206 to processing unit 204. System bus 208 may comprise any of several types of bus structures including a memory bus or memory controller, a peripheral bus, and a local bus using any of a variety of bus architectures.

Computing system 200 may include a variety of computer readable storage media. Computer readable storage media can be any available storage media that can be accessed by computing system 200. By way of example, and not of limitation, computer readable storage media may comprise volatile and nonvolatile storage media and removable and non-removable storage media. Computer readable storage media storing computer instructions implementing embodiments disclosed herein may be manufactured by known methods and materials and may rely on known programming languages and techniques for storage of information thereon. Examples of computer readable storage media may include, but are not limited to, random access memory (RAM), read only memory (ROM), EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 200.

In the example shown in FIG. 2, system memory 206 includes ROM 210 and RAM 212. ROM 210 may store basic input/output system 214 (BIOS), containing the basic routines that help to transfer information between elements within computing system 200, such as those used during start-up. RAM 212 may store data and/or program modules that are immediately accessible to and/or presently being operated on by processing unit 204. By way of example, and not of limitation, FIG. 2 shows RAM 212 storing operating system 216, application programs 218, other program modules 220, and program data 222.

Computing system 200 may also include other removable/non-removable, volatile/nonvolatile computer readable storage media that can be employed to store computer instructions implementing some embodiments disclosed herein. By way of example only, computing system 200 may include hard disk drive 224, a magnetic disk drive 226, and/or optical disk drive 230. Hard drive (HD) 224 may read from and write to non-removable, nonvolatile magnetic media. Disk drive 226 may read from and write to removable, nonvolatile magnetic disk 228. Optical disk drive 230 may read from and write to a removable, nonvolatile optical disk 232 such as a CD ROM or other optical medium. Other removable/non-removable, volatile/nonvolatile computer readable storage media are also possible. As illustrated in FIG. 2, hard drive 224 may be connected to system bus 208 via a non-removable memory interface, such as interface 234, and magnetic disk drive 226 and optical disk drive 230 may be connected to system bus 208 via a removable memory interface, such as interface 238.

The drives and their associated computer readable storage media, discussed above, may provide storage of computer readable instructions, data structures, program modules and other data for computing system 200. For example, hard disk drive 224 may store operating system 268, application programs 270, other program modules 272 and program data 274. Note that these components can either be the same as or different from operating system 216, application programs 218, other program modules 220, and program data 222.

A user may enter commands and information into computing system 200 via input devices such as tablet or electronic digitizer 240, microphone 242, keyboard 244, and pointing device 246. Pointing device 246 may comprise a mouse, a trackball, and/or a touch pad. These and other input devices may be connected to processing unit 204 via user input interface 248. User input interface 248 may be coupled to system bus 208 or via other interface and bus structures, such as a parallel port, a game port, or a universal serial bus (USB).

Monitor or other type of display device 250 may be connected to system bus 208 via an interface, such as a video interface 252. Monitor 250 may also be integrated with a touch-screen panel or the like. Note that the monitor and/or touch screen panel can be physically coupled to a housing in which computing system 200 is incorporated, such as in a tablet-type personal computer. Computing system 200 may comprise additional peripheral output devices such as speakers 256 and printer 254, which may be connected via an output peripheral interface 258 or the like.

Computing system 200 may operate in a networked environment and may have logical connections to one or more remote computers, such as remote computing system 260. Remote computing system 260 may be a personal computer, a server, a router, a network PC, a peer device or other common network node. Remote computing system 260 may have multiple application programs 280. Although only a memory storage device 262 is shown in FIG. 2, remote computing system 260 may include many or all of the components and features described above with reference to computing system 200. Logical connections between computing system 200 and remote computing system 260 may include local area network (LAN) 264, connecting through network interface 276, and wide area network (WAN) 266, connecting via modem 278. Additional networks may also be included.

Following the above examples, suppose computing system 200 is associated with user 330, remote computing system 260 may represent proxy server computer 350 operating in company network 340 and being communicatively connected to computing system 200 via LAN 264, or it may represent another computer on Internet 110 or a server computer hosting social networking site 320 and being communicatively connected thereto via WAN 266.

Embodiments disclosed herein can be implemented to run on various platforms operating under system software such as IBM OS/2®, Linux®, UNIX®, Microsoft Windows®, Apple Mac OSX® and others in development or commercially available. The functionality disclosed herein may be embodied directly in hardware, in a software module executed by a processor or in any combination of the two. Furthermore, software operations may be executed, in part or wholly, by one or more servers or a client's system, via hardware, software module or any combination of the two. A software module (program or executable) may reside on one or more computer readable storage media described above. In FIG. 2, an exemplary storage medium is coupled to the processor such that the processor can read information from, and write information to, the storage medium. In the alternative, the storage medium may be integral to the processor. The processor and the storage medium may also reside in an application specific integrated circuit (ASIC). The bus may be an optical or conventional bus operating pursuant to various protocols that are known to those skilled in the art.

In an illustrative embodiment, computer instructions implementing some embodiments disclosed herein may comprise lines of compiled Java, or other language code. Other architectures may be used. In the hardware configuration above, various software components may reside on any single computer or on any combination of separate computers. In some embodiments, some or all of the software components may reside on the same computer. In some embodiments, the functions of any of the systems and methods may be performed by a single computer. In some embodiments, different computers than are shown in FIG. 2 may perform those functions. Additionally, a computer program or its software components with such code may be embodied in more than one computer readable medium in more than one computer.

Figure 3:
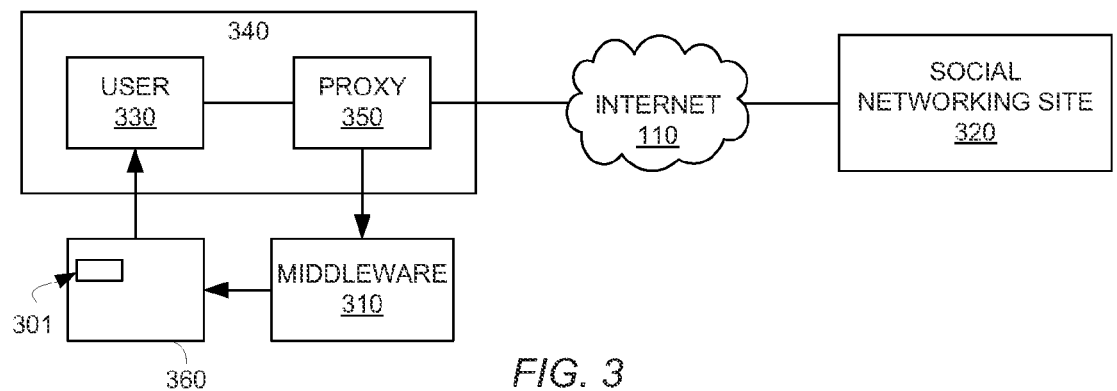
FIG. 3 depicts a diagrammatic representation of a high level network architecture for controlling access by network users to an example social networking site according to an embodiment disclosed herein.

FIG. 3 depicts a diagrammatic representation of how an entity or organization implementing an embodiment disclosed herein may monitor and protect network traffic to and from social networking sites. In this example, Company B may own and operate social networking site 320 independent of Company A which owns and operates enterprise computing environment 340, also referred to herein as company network 340, internal network 340 or simply network 340. Company A may represent an entity. Examples of such an entity may include, but are not limited to, an enterprise, a business, a company, a school, a hospital, a library, a government agency, an office, a home, and so on. End user 330 may represent any individual in a public or private office, government, home, or school setting and may include software and hardware necessary for accessing network 340 and Internet 110. End user 330 may utilize a computing device to bi-directionally connect to Internet 110 where social networking site 320 resides. Communications media that may facilitate such bi-directional connections may include an intranet, a virtual private network ("VPN"), and/or a wireless network, etc.

Company B may comprise hardware, software, infrastructure, and people necessary to operate and maintain social networking site 320. Social networking site 320 may be implemented in a manner known to those skilled in the art. As a specific example, a user may log in to social networking site 320 via a browser application or via a mobile application running on the user's wired or wireless computing device. Examples of a wireless computing device may include, but are not limited to, a laptop computer, a personal digital assistant (PDA), a mobile phone, an Internet enabled mobile device, and so on.

Figure 4:
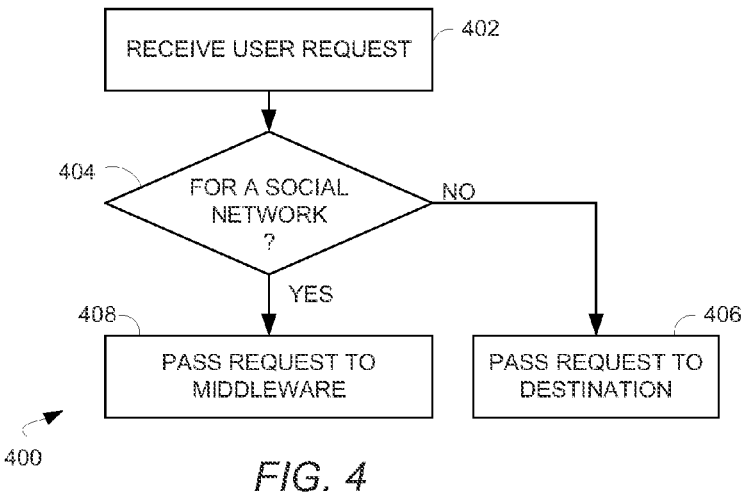
FIG. 4 depicts a flow diagram illustrating a method of processing user requests, including requests to access a social networking site.

In the example of FIG. 3, proxy server 350 resides within network 340 and is bi-directionally coupled to end user 330 via a wired or wireless internal network connection. Proxy server 350 may be communicatively coupled to social network 320 over Internet 110. Proxy server 350 can be implemented in the form of control logic in software or hardware or a combination of both. In some embodiments, proxy server 350 may function as a gateway or intermediary between end user 330 and social networking site 320. More specifically, proxy server 350 may be responsible for receiving all incoming requests from and sending corresponding responses to end user 330. As illustrated in FIG. 4, in some embodiments of flow 400, proxy server 350 may operate to receive a user request from user 330 (step 402), determine whether that request contains a destination pertaining to a social networking site (step 404), and either pass the request from user 330 that is destined to a social networking site to middleware 310 for processing (step 408) or pass the request to the destination (step 406) if it is not destined to a social networking site.

In some embodiments, middleware 310 may operate to process a request from user 330 for a page from social networking site 320, obtain the requested page (the original application data) from social networking site 320, determine if any modification to the original application data would be necessary per Company A's policy as applied to user 330, prepare corresponding page 360 that includes any necessary feature-level modifications 301 to the original application data provided by social networking site 320, and return modified page 360 to proxy server 350 or user 330 as a response to the request from user 330. In some embodiments, other than certain feature(s) being disabled or unavailable to user 330, page 360 may be substantially the same as the original page requested from social networking site 320.

In some embodiments, middleware 310 may reside within network 340. In some embodiments, middleware 310 may operate outside of network 340. In some embodiments, middleware 310 may be implemented as a service to proxy server 350 or network 340. In some embodiments, middleware 310 may be implemented as part of proxy server 350. Some embodiments may be implemented without proxy server 350. For example, when user 330 sends, via a browser application running on a computing device, a request for a page from social networking site 320, the domain name server (DNS) may redirect the user request to middleware 310. Middleware 310 may process the user request, obtain the requested application data from social networking site 320, structure the unstructured application data, prepare modified page 360 if necessary according to a set of predetermined access control rules, and return an appropriate response to user 330. For additional example embodiments of middleware 310, including the ability to perform feature-level modifications to a page originating from a third party network site such as a social networking site, readers are directed to U.S. patent application Ser. No. 12/785,278, filed May 21, 2010, entitled "METHOD, SYSTEM AND COMPUTER PROGRAM PRODUCT FOR ENFORCING ACCESS CONTROLS TO FEATURES AND SUBFEATURES ON UNCONTROLLED WEB APPLICATION," which is fully incorporated herein by reference.

As more and more users in network 340 may want to access social networking sites (also referred to as social networking platforms or simply social networks), it can be helpful to track social network accounts of these network users and apply appropriate business rules and/or company policies to those social network accounts. Example rules and policies may relate to, but are not limited by, network access control, archiving, and content moderation and may be applied each user account across social networking platforms or may vary among individual social networking platforms.

Some network traffic monitoring methodologies can track social network usernames at a proxy server. For example, as described above, proxy server 350 may operate to receive a user request from user 330 and determine whether that request contains a destination pertaining to a social networking site. If the request from user 330 is destined to social networking site 320, proxy server 350 can pass the request to middleware 310 for further processing. Middleware 310 may be programmed to monitor a set of users in network 340, including user 330. Middleware 310 may parse the request to extract user-provided information such as username "SocialUser" that user 330 uses on social networking site 320 as well as other identifying information such as source (e.g., a device address, a network or IP address, etc.), destination (e.g., a universal resource locator address, etc.). Middleware 310 (or proxy server 350 when middleware 310 is embodied therein) may then look up any policies that are applicable to "SocialUser" and apply or otherwise take certain action with respect to the "SocialUser" according to predetermined rules. As this example illustrates, middleware 310 can apply policies and take appropriate action with respect to a username. However, middleware 310 does not have a user's account information on a social networking site. Thus, middleware 310 cannot determine whether a social identity on social networking site 320 is associated with a user in network 340.

From the perspective of a business entity or the like operating network 340, the lack of knowledge on network users' social identities on external, third party social networking platforms can raise several issues. For example, user 330 in network 340 may have multiple social network accounts with social networking site 320. Middleware 310 can process a request from user 330, extract a username from the request, determine what policies are applicable to the username, and apply appropriate policies. However, middleware 310 has no knowledge that this username may be one of many usernames used by user 330 on social networking site 320. Since policies are applied to each username and not to the underlying unique individual, there is no way of knowing if all applicable policies are correctly and consistently applied across all social identities belonging to user 330 (and hence no way of enforcing same). Now, suppose multiple users in network 340 have multiple social network accounts, middleware 310 may have no knowledge as to which social network username is associated with which specific user in network 340 and, again, no way of knowing if policies applicable to a particular user are correctly and consistently applied across all social identities belonging to that particular user. Complicating the matter is that users in network 340 may change their usernames on any of their accounts at any time. The lack of knowledge on a user's true identity means that when a user uses a new username on a social network, policies that are tied to an old username may not, although they should, be applied correspondingly to the user's new username. By observing traffic between the user and the social network, middleware 310 may associate the new username to the same user and apply policies accordingly. However, middleware 310 may have no knowledge that these usernames belong to the same user.

Moreover, it is possible that not all traffic between user 330 and social networking site 320 go through proxy server 350 (e.g., user 330 may post to social networking site 320 offline, perhaps using a company-issued device). This can be particularly troublesome if there is a policy to archive all contents user 330 posts, shares, or otherwise publishes on social networking site 320. Since offline user requests do not go through proxy server 350, middleware 310 may have no way of knowing which post is associated with user 330 and no way of applying (and enforcing) the archiving policy accordingly. This can be even more problematic if all contents posted on social networks by users in network 340 must be archived. Since (external) social identities of users in network 340 are unknown to middleware 310, there is no way for middleware 310 to enforce this policy.

Furthermore, suppose a moderation policy requires that all contents from network 340 must be moderated before they can be posted on social networks. However, since user contents may be shared at an application level via an application programming interface (API) (e.g., between a browser application running on a user device and a social network application running on a remote server machine), there is not an easy way for middleware 310 to tie the shared user contents to a single, individual user and moderate accordingly.

As those skilled in the art can appreciate, API refers to an interface between applications and comprises specifications and code (computer instructions) that these applications can follow in order to interact and communicate with each other. Using APIs, content created at one network location can be dynamically posted (shared) and updated in multiple locations on the web. When used in the context of the web, an API can be a defined set of Hypertext Transfer Protocol (HTTP) request messages, along with a definition of the structure of response messages, which is usually in Extensible markup language (XML) or JavaScript Object Notation (JSON) format. Social networking sites may run on different platforms and utilize different programming languages, including XML, JSON, Hypertext Markup Language (HTML), and asynchronous JavaScript and XML (AJAX). XML, JSON, HTML, and AJAX are known to those skilled in the art and thus are not further described herein.

Embodiments disclosed herein can monitor requests from network users and corresponding responses from social networking sites and programmatically decode how user information is transferred in order to track social identities of individual network users at an application level. As used herein, a social identity refers to a user's identity within a social network, regardless of which account name, public name, or username the user is using on the social network. Embodiments disclosed herein can be applied to multiple network users across multiple social networking platforms, regardless of whether each network user has a single account with each of a plurality of social networking platforms or multiple accounts with multiple social networking platforms. Doing so can ensure that appropriate policies can be applied to individual network users in an efficient and consistent manner and that contents they shared on social networking platforms can be moderated and archived accordingly.

Figure 5:
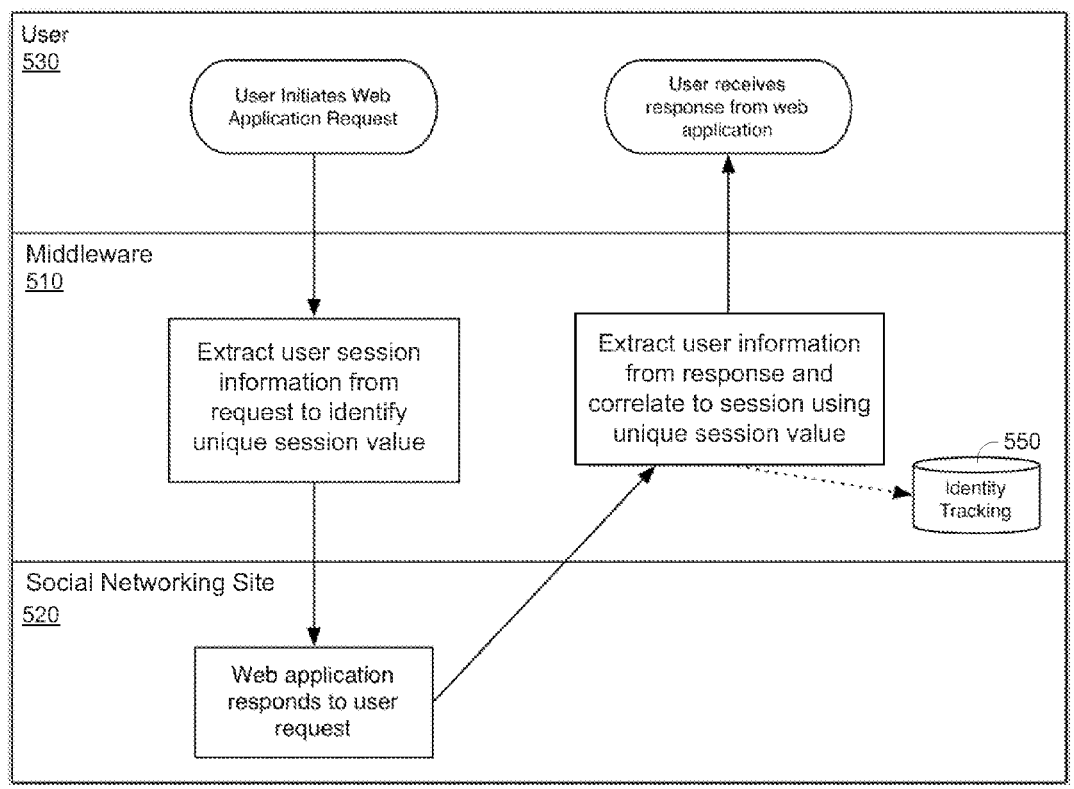
FIG. 5 depicts a data flow diagram illustrating data traffic to and from a social networking site according to an embodiment disclosed herein.

FIG. 5 depicts a diagrammatic representation of a high level flow 500 of data to and from a social networking web application. Embodiments of middleware 510 can be implemented as a middleware communicatively connected to user 530 and social networking site 520 and configured to monitor network traffic between user 530 and social networking site 520 and extract user and session information from requests and responses.

Those skilled in the art will appreciate that requests and responses to and from different social networking sites may vary in form as well as content. Embodiments can be configured to programmatically parse and decode different types of social networking requests and responses in order to extract certain session cookies and social networking identity information (social identities). For example, like middleware 310, in some embodiments, middleware 510 may be implemented on a server computer in a private network and can intercept requests from users in the network. When middleware 510 receives a request from a user, middleware 510 may parse the request and determine that the request is meant for a particular social network (e.g., Twitter). Different social networks have different parameters for their session cookies. Thus, middleware 510 may search for a session cookie in the request that is specific to the particular social network (e.g., "_twitter_sess") and compare that session cookie with those stored in identity database 550. If the specific session cookie is found in identity database 550, middleware 510 can retrieve a social network ID (which represents a social identity for the user) associated with the session cookie. If the particular session cookie is not stored in identity database 550, middleware 510 may cache the session cookie extracted from the request, parse a corresponding response received from the particular social network, obtain a social network identifier from the response, associate the cached session cookie extracted from the request with the social network identification obtained from the corresponding response, and update identity database 550 with a new social identity for the user. As further exemplified below, embodiments can collect social identities from multiple social networking platforms and utilize these social identities to, among other things, correlate user information, apply appropriate policies consistently across social networking platforms, and generate reports on user activities on social networking platforms.

Before or after user 530 logs in with middleware 510, user 530 may direct a browser application running on the user's computing device to social networking site 520, by putting the social networking site's Universal Resource Locator (URL) address in the address bar of the browser application or pointing to a link to social networking site 520. The browser application may send a request (e.g., an HTTP GET) to social networking site 520 and, in response, social networking site 520 may cause a login screen to be presented to the user, asking the user to provide a user identification (username) and password. After user 530 enters the required login information, the browser application may send a request containing the username (e.g., "SocialUser") and password to social networking site 520. In return, social networking site 520 may send a response containing application data such as an identifier associated with the username (e.g., "SocialUser: 1234567") and session cookies. At this point, middleware 510 knows the user's username (e.g., "SocialUser") on social networking site 520 and the identifier (e.g., "1234567") assigned by social networking site 520 to the username. The session cookies may remain valid for a period of time or for as long as the user is logged in and may differ from session to session. If user 530 has multiple accounts with social networking site 520, the session cookies may differ from account to account.

Once the user is logged in to a social networking site, the user's browser application may include the session cookies in the HTTP request to the web application without having to include the username (e.g., "SocialUser"). While the web application at the social networking site may know who the user is (e.g., "1234567") and what account the user is using (e.g., by tracking the session cookies), this knowledge is generally not available to external proxy servers. Thus, in many cases, a proxy server in a private network may receive and process requests from a user in the network as described above, but these requests may contain no user identity information indicating who the user is and/or what social network account the user is using.

As a specific example, suppose a user submits a status update to a social networking site "www.twitter.com". The status update (an HTTP request) may look like this:

Host  twitter.com
User-Agent  Mozilla/5.0 (Macintosh; U; Intel Mac OS X 10.6; en-US; rv:1.9.2.12)
Gecko/20101026 Firefox/3.6.12
Cookie_utma=43838368.64713331.1277907868.1288384340.
1289234691.15;
_utmz=43838368.1277907868.1.1.utmcsr=(direct)|utmccn= (direct)|utmcmd=(none);

-continued

_utmv=43838368.lang%3A%20en;
k=65.46.137.18.1289234641222202;
guest_id=128923464430421023;
_twitter_sess=BAh7DjoTcGFzc3dvcmRfdG9rZW4iLWMyY2Y1
ODQ5MTQ3OTkzMjg3ZGU3OGM5%250AOWJmMTc2OWVkZm
RhZjZkMGl6E3Nob3dfaGVscF9saW5rMDoMY3NyZl9pZ
Cll%250AMDY2ZWQxMjEwM2Q2OWU3N2Q3YTQ5YzMzODU
3MzlxNDQiKHNob3dfZGlzY292%250AZXJhYmlsaXR5X
2Zvcl9xdWJpdHp0ZXN0MDoPY3JlYXRlZF9hdGwrCFF9
Xyws%250AAToJdXNlcmtkDJMPzOhVpbl9uZXdfdXNlcl
9mbG93MClKZmxhc2hJQzonQWN0%250AaW9uQ29udHJv
bGxlcjo6Rmxhc2g6OkZsYXNoNoSGFzaHsABjoKQHVzZWR
7ADoH%250AaWQiJWJhZTY3NTNmMGM5MWUxMTAyMGViY
zZkYTQ2ZjM4NzQ4--c324b1e1a9faa48b63792d45b6
8fe1d68573bf52;
authenticity_token=5075e94c0d55fe22926278cabe7bd9454496e287&
status=this+is+a+status+update&twttr=true&return_rendered_status=
true&lat=&lon=&place_id=&display_coordinates=false This HTTP request contains a status update posted to Twitter, but has no identifying information about the Twitter identity that the post belongs to. However, the HTTP request contains a Twitter session cookie ("_twitter_sess") that can be mapped to a user's Twitter identity.

In some embodiments, mapping the session cookie to a user may be a two-step process in which both a request and a response are parsed to extract all of the information needed. In some embodiments, mapping the session cookie to a user may be a one-step process in which a request or a response is parsed to extract all of the information needed. For example, in some embodiments, middleware 510 may cache an incoming request containing a new session cookie and process a corresponding response containing the session cookie and the user social network identity information. Once all of the information is collected, identity database 550 (also referred to as an identity tracking table or simply a table) may be updated to allow for future mapping based on the session cookie.

Below is an example of how the user social network identity information can be extracted.

Figure 6:
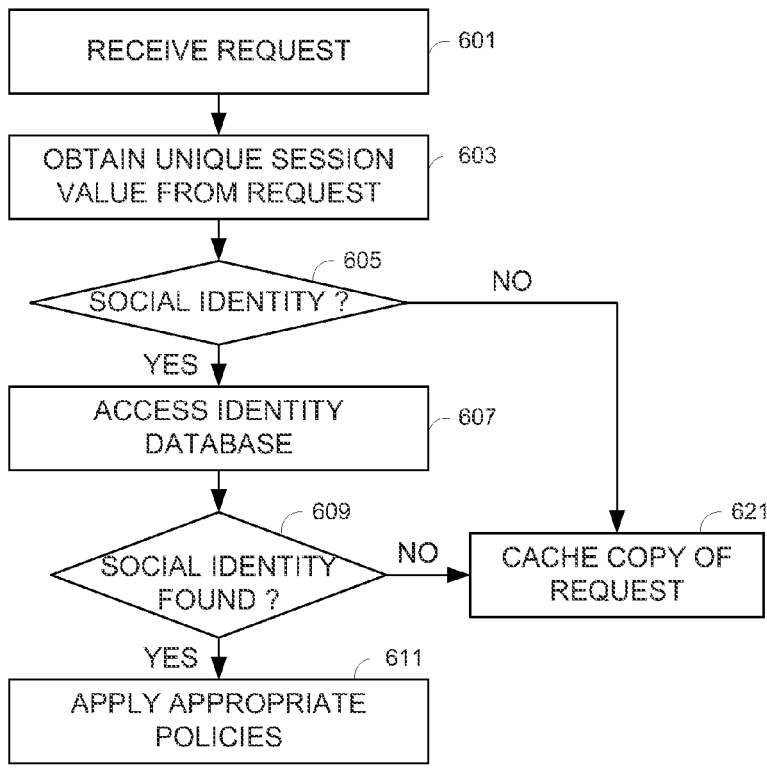
FIG. 6 depicts a flow diagram illustrating one embodiment of a method of processing a user request.

Referring to FIG. 6, this process can begin when a user logs into a social networking site and establishes a session. At that time, the user may or may not have logged in with middleware 510, so it is possible that a user request received at middleware 510 (step 601) may contain no user identity information. If the user has already logged in to the social networking site, the request may have a unique session value. Middleware 510 may programmatically parse the request to obtain the unique session value (step 603). If a social identity can be obtained from the unique session value (step 605), middleware 510 may access identity database 550 (step 607) and determine whether the social identity associated with the request exists in identity database 550 (step 609). If so, middleware 510 may process the request in accordance with appropriate policies such as access control, moderation, and archiving policies that are associated with the social identity (step 611). This is possible because the user is also logged into middleware 510. Middleware 510 has access to a database storing information on users in the private network. When the user logs into middleware 510, middleware 510 can associate the user with a network account and knows what policies apply to the network account. For example, if the user using the social identity is in a user group "Marketing", the request is processed according to all policies applicable to the "Marketing" group.

If the request contains no session cookie specific to the social networking site (e.g., the user has not logged into the social networking site) or if a social identity cannot be found in identity database 550 (e.g., the user has a new social identity), middleware 510 may cache a copy of the browser request containing the unique session value (step 621). As will be explained below, the cached request can be used to obtain additional user identity information.

After the user is logged in with the social networking site, a session cookie is created by the social networking site and provided to the user's browser application for future requests. This session cookie has a unique session value specific to the particular social networking site. As illustrated in flow 500, middleware 510 can utilize this unique session value to correlate actual user information extracted from web application responses. As discussed above, session cookies may last for a certain period of time or it may last for as long as the user is logged in. Middleware 510 may monitor user requests as discussed above and when middleware 510 finds a session cookie that is not stored in identity database 550, middleware 510 may begin the process of extracting user identity information and updating identity database 550 accordingly.

Below is an example of how a unique session value can be identified from a request that designates a social networking site "www.linkedin.com".

Suppose the request contains the following:

```
Host    www.likedin.com
User-Agent    Mozilla/5.0 (Macintosh; Intel Mac OS X 10.6; rv:7.0.1)
Gecko/20100101
Firefox/7.0.1
Accept text/html,application/xhtml+xml,application/xml;q=0.9,*/*;q=0.8
Accept-Language    en-us,en;q=0.5
Accept-Encoding    gzip, deflate
Accept-Charset    ISO-8859-1,utf-8;q=0.7,*;q=0.7
Connection    keep-alive
Referrer    http://www.linkedin.com/home
Cookie bcookie="v=1&0d32a493-4115-474f-b6ea-41f9eba8fae5";
visit=M;
_utma=23068709.565044339.1318030947.1318348499.1318515918.3;
_utmz=23068709.1318030947.1.1.utmcsr=(direct)|utmccn=
(direct)|utmcmd=(none);
_utmv=23068709.guest; _qca=P0-2135841081-1318030946661;
_lipt="0_CriCnsJHm6T0xZtN44sLtrhXUWTly_UbK8wYy6G6qcqFn9
BdsQ66lv_2LCXJ9QSEcEs3uSGO_jb7HMuxaCkA02N_5RiOYRfqk
3cf4xRW0g03ubmlCsRW-JUx7fm2llGMGQw0WGyRYNs54m_anBaA
nPwcXYkMBDHNVUR3oLuSnu-4PuKAxTHdWLPMgwiQ6kODBkO4w
9iRcTPiWEOTURzP6Y5Zu1MrFo8GoOaniDrEr7HztMlJZXS8Hfp-xC
TSTZlXnP9vF6m-JkQ0Kp0hozQHrJDxn9pUy94vAF4KRSJxq-Hfo
R4R6TGJQ0fe-rzvKxw"; JSESSIONID="ajax:2682943850425743144";
leo_auth_token="LIM:9408515:a:1318515937:6d471caeb7137603
fd16cfbdf0a996221b8db57d"; X-LI-IDC=C1; lang="v=2&lang=en";
NSC_MC_WT_FU_IUUQ=ffffffffaf1994bb45525d5f4f58455
e445a4a42198d;
_utmb=23068709.4.10.1318515918; _utmc=23068709;
NSC_MC_WT_DTQ_IUUQ=ffffffffaf1998c645525d5f4f58455
e445a4a42199f
```

In some embodiments, middleware 510 can be configured to retrieve the Cookie field and parse it for a unique session value (e.g., a credential, a token, or the like) issued by the web application. In this example, middleware 510 is operable to parse a token leo_auth_token="LIM:9408515:a: 1318515937:6d471caeb7137603fd16cfbdf0a996221b8 db57d" and extract a unique identifier "9408515" which is how the web application (LinkedIn in this example) identifies the user.

The token in the above example is initially provided by the web application for the user's browser to communicate with the web application (during the session, as long as the user is logged in with the web application, in a predetermined time period, or the like). However, the token does not contain the actual user account registered with the social network. Rather, the web application uses the token or other unique value as a way to identify the user. Middleware 510 can be programmed to identity this token from the cookie field in a request or a response, extract a unique identifier from the token, associate the unique identifier with the user, store it as a social identity (a social network ID) of the user on the social network, use it to identify requests and responses associated with the user when the user is communicating with this particular social network, and correlate user information with respect to the individual user. Thus, middleware 510 may operate to inspect each request designating a social networking site as well as each response received therefrom to extract all the user information associated with the user and may do so across multiple social networking platforms. As those skilled in the art can appreciate, user social identities can vary across social networking platforms. In some embodiments, middleware 510 can be configured to identify various social identities across multiple platforms and associate them with the same user. As another example, below is how a user's social identity can be determined from a response received from a social networking site known as "Twitter".

Suppose the response from Twitter contains the following HTML element:

```
<span id="screen-name">
    ksofm
</span>
```

In this example, middleware 510 can be configured to parse the response from Twitter, identify this HTML element and record the contents of the span as the Twitter identity of the user in table 550.

Below is an example of how middleware 510 may be configured to handle a new session cookie. Suppose middleware 510 intercepts a request as follows:

```
REQUEST
GET / HTTP/1.1
Host    twitter.com
User-Agent    Mozilla/5.0 (Macintosh; U; Intel Mac OS X 10.6; en-US;
rv:1.9.2.12)
Gecko/20101026 Firefox/3.6.12
Accept text/html,application/xhtml+xml,application/xml;q=0.9,*/*;q=0.8
Accept-Language    en-us,en;q=0.5
Accept-Encoding    gzip,deflate
Accept-Charset    ISO-8859-1,utf-8;q=0.7,*;q=0.7
Keep-Alive    115
Connection    keep-alive
Cookie _utma=43838368.64713331.1277907868.1288384340.
1289234691.15;
_utmz=43838368.1277907868.1.1.utmcsr=(direct)|utmccn=
(direct)|utmcmd=(none);
_utmv=43838368.lang%3A%20en; k=65.46.137.18.1289234641222202;
guest_id=128923464430421023;
...
_twitter_sess=BAh7DjoTcGFzc3dvcmRfdG9rZW4iLWMyY2Y1OD
Q5MTQ3OTkzMjg3ZGU3OGM5%250AOWJmMTc2OWVkZmRhZj
ZkMGl6E3Nob3dfaGVscF9saW5rMDoMY3NyZl9pZCll%250AMmR
kNzc1YjQ3YzJiMmRjNjZjOTU2YjgzZDcyYzkxODEiKHNob3dfZ
GlzY292%250AZXJhYmlsaXR5X2Zvcl9xdWJpdHp0ZXN0MDoPY3
JlYXRlZF9hdGwrCKwdbSws%250AAToJdXNlcmkDJMPzOhVpbl9
uZXdfdXNlcl9mbG93M3ClKZmxhc2hJQzonQWN0%250AaW9uQ29u
dHJvbGxlcjo6Rmxhc2g6OkZsYXNoSGFzaHsABjoKQHVzZWR7AD
oH%250AaWQiJWFhYTZiNDRlZGNiZDBjYjliYTgxYTcyY2Q4MTV
mMWU3--9e178fb7e0210d2d4d366fc54b07bcc2ee2665fc;
original_referer=4bfz%2B%2BmebEkRkMWFCXm%2FCUOsv
DoVeFTI;
_utmb=43838368.15.9.1289234697369; _utmc=43838368;
phx_seen_dialog-15975204=true; tz_offset_sec=-21600; lang=en;
auth_token=d6732b1a5e1d00fabf3244003f820a38404edfe6
```

In this example, middleware 510 may be configured to look for a session cookie "_twitter_sess" and compare that session cookie with those stored in identity database 550. In this case, the search returns no results, indicating that this is a new session and that middleware 510 is not tracking this session. Middleware 510 may cache a copy of this request so the associated response can be examined to extract more user information.

Figure 7:
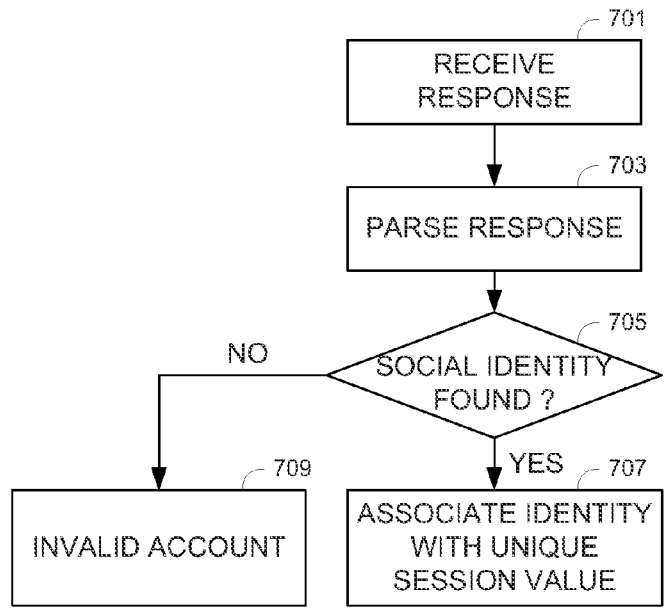
FIG. 7 depicts a flow diagram illustrating one embodiment of a method of processing a response from a social networking site.

Referring to FIG. 7, when an associated response is received from a social networking site (step 701), middleware 510 may parse the response to obtain a unique ID (step 703). If a unique ID can be extracted from the response (step 705), middleware 510 may associate the unique ID with a unique session value from a copy of an associated request (step 621) and store the relationship in database 550 (step 707). If the unique ID cannot be mapped to a user identity in database 550 (e.g., the social networking site is responding to a POST request sent from the user and middleware 510 is unable to extract a unique session value from the POST request), middleware 510 may determine that the response is associated with an invalid account and block the requested activity (step 709).

Below is an example response to the above example request.

```
RESPONSE
<html>
<head>
...
<meta content="y" name="session-loggedin" />
<meta content="15975204" name="session-userid" />
<meta content="cameroncooper" name="session-user-screen_name" />
<title id="page_title">Twitter / Home</title>
...
</head>
...
</html>
```

The extracted data can be used to update identity database 550 and used in subsequent requests. Suppose the social identities in the above examples are associated with the same user, below is an example of the user's identity record in identity database 550. This example record contains correlated information extracted from the above example request and response. Optionally, an internal user ID may be utilized by middleware 510 to organize records in database 550.

| Unique Session Value | Social Network | Social Network ID | User ID |
|---|---|---|---|
| leo_auth_token="LIM:9408515:a:1318515937:6d471caeb7137603fd16cfbdf0a996221b8db57d" | LinkedIn | 9408515 | 01 |
| _twitter_sess=BAh7DjoTcGFzc3dvcmRfdG9rZW4iLWMyY2Y1ODQ5MTQ3OTkzMjg3ZGU3OGM5%250AOWJmMTc2OWVkZmRhZjZkMGl6E3Nob3dfaGVscF9saW5rMDoMY3NyZl9pZCll%250AMmRkNzc1YjQ3YzJiMmRjNjZjOTU2YjgzZDcyYzkxODEiKHNob3dfZGlzY292%250AZXJhYmlsaXR5X2Zvcl9xdWJpdHp0ZXN0MDoPY3JlYXRlZF9hdGwrCKwdbSws%250AAToJdXNlcmkDJMPzOhVpbl9uZXdfdXNlcl9mbG93MClKZmxhc2hJQzonQWN0%250AaW9uQ29udHJvbGxlcjo6Rmxhc2g6Ok ZsYXNoSGFzaHsABjoKQHVzZWR7ADoH%250AaWQiJWFhYTZiNDRlZGNiZDBjYjliYTgxYTcyY2Q4MTVmMWU3--9e178fb7e0210d2d4d366fc54b07bcc2ee2665fc | Twitter | 15975204 | 01 |
| 1234567 | Facebook | 1234567 | 1 |

Information stored in database 550 may be useful in many applications. For example, in some embodiments, user 530 may have a first account and a second account with social networking site 520. The first account may be associated with a business entity. According to a policy set forth by the business entity, status updates may not be posted to social networking site 520. After user 530 logins into social networking site 520, middleware 510 may parse a user request, extract a social networking site session cookie from the user request, extract a social network identity from a corresponding Web application response, correlated these pieces of information, and determine that the session cookie is associated with the first account of user 530. Middleware 510 may determine that the status update policy applies to the first account and block any attempt by user 530 to post status updates on social networking site 520 via the first account. As another example, the second account may be subject to an archiving policy. Middleware 510 may, in a manner similar to the above example, determine that the session cookie is associated with the second account of user 530 and save all the contents posted by user 530 on social networking site 520 via the second account. Middleware 510 may generate a report on account activities, including information on contents posted by user 530 from either or both accounts. Other types of applications may also be possible.

In some embodiments, various policies may be applied using filters. Middleware 510 may utilize a set of filters to identify a specific activity contained in a request. If the activity is allowed for that particular user account, middleware 510 may permit the activity to take place by not blocking the activity; however, if the activity is not allowed, then middleware 510 may operate to block the activity by modifying the original application data to delete or otherwise disable the non-permitted activity. In some embodiments, middleware 510 may generate a message explaining that the activity has been blocked because that particular social identity does not have the proper permissions to execute the desired action.

Figure 8:
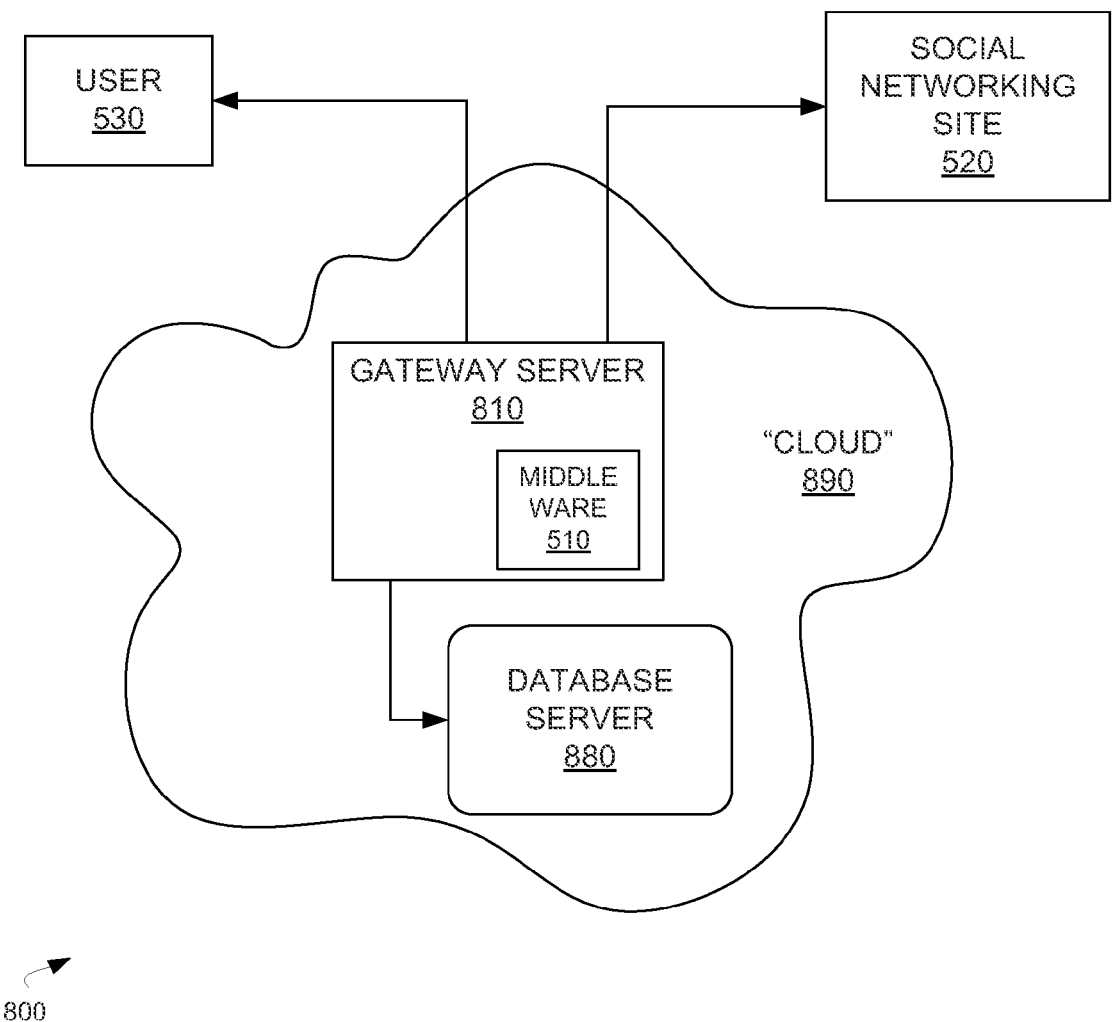
FIG. 8 depicts a diagrammatic representation of one embodiment of a network architecture for monitoring, identifying, and tracking social identities of network users.

Those skilled in the arts will recognize that the disclosed embodiments have relevance to a wide variety of areas in addition to the specific examples described below. For example, although the examples above are described in the context of employers and employees, some embodiments disclosed herein can be adapted or otherwise implemented to work in other types of relationships, circumstances, and places such as public libraries, parent-child, school-student, or any other place or relationship where it is desirable to monitor and protect network traffic to and from social networking sites. Further, as illustrated in FIG. 8, in some embodiments, middleware 510 may leverage the technology known as "cloud computing". In this example, middleware 510 resides on gateway server 810 communicatively connected to database server 880 in cloud 890. Gateway server 810 may be communicatively connected to user 530 and social networking site 520 over cloud 890. Other arrangements are also possible.

Thus, although shown and described throughout this disclosure with specific reference to an enterprise, this disclosure may encompass all types of networking and business environments, including, but are not limited to, small businesses, individual users, homes, public networks, etc. Further, in addition to social networking, those skilled in the art will appreciate that embodiments disclosed herein can be readily adapted for use in a wide array of arts and this disclosure is intended to include the same.

Example embodiments disclosed herein are meant to be illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for tracking social identities, comprising:
at a server computer communicatively connected to a user device and a social networking platform, extracting a unique session value from a request sent by a browser application running on the user device, the user device being associated with a user in a first network;
determining whether the unique session value contains a social identity, the social identity being a unique identifier used by the social networking platform to identify the user on the social networking platform, the social networking platform being external to the first network;
if the unique session value extracted from the request contains no social identity:
  extracting a unique identifier from a response to the request;
  associating the unique identifier from the response with the unique session value from the request; and
  updating an identity database to reflect a new social identity of the user, the new social identity referencing the unique identifier being used by the social networking platform to identify the user on the social networking platform;
if a social identity is found in the unique session value extracted from the request, comparing the social identity with social identities stored in the identity database; and
if the social identity is found to be one of the social identities stored in the identity database, applying one or more policies to an activity requested by the user, wherein the user is in a group of users in the first network and wherein the one or more policies are associated with the group of users.

2. The method according to claim 1, further comprising:
caching a copy of the request if the unique session value extracted from the request contains no social identity; and
forwarding the request to a web application on the social networking platform.

3. The method according to claim 1, further comprising:
if the social identity is not found in the social identities stored in the identity database:
  caching a copy of the request; and
  forwarding the request to a web application on the social networking platform.

4. The method according to claim 1, further comprising:
if the unique identifier cannot be extracted from the response to the request, denying an activity requested by the user.

5. A computer program product comprising at least one non-transitory computer readable medium storing instructions translatable by a computer to perform:
extracting a unique session value from a request sent by a browser application running on a user device, the user device being associated with a user in a first network, the computer being communicatively connected to the user device and a social networking platform;
determining whether the unique session value contains a social identity, the social identity being a unique identifier used by the social networking platform to identify the user on the social networking platform, the social networking platform being external to the first network;
if the unique session value extracted from the request contains no social identity:
  extracting a unique identifier from a response to the request;
  associating the unique identifier from the response with the unique session value from the request; and
  updating an identity database to reflect a new social identity of the user, the new social identity referencing the unique identifier being used by the social networking platform to identify the user on the social networking platform;

if a social identity is found in the unique session value extracted from the request, comparing the social identity with social identities stored in the identity database; and if the social identity is found to be one of the social identities stored in the identity database, applying one or more policies to an activity requested by the user, wherein the user is in a group of users in the first network and wherein the one or more policies are associated with the group of users.

6. The computer program product of claim 5, wherein the instructions are further translatable by the computer to perform:

caching a copy of the request if the unique session value extracted from the request contains no social identity; and forwarding the request to a web application on the social networking platform.

7. The computer program product of claim 5, wherein the instructions are further translatable by the computer to perform:

if the social identity is not found in the social identities stored in the identity database:
  caching a copy of the request; and
  forwarding the request to a web application on the social networking platform.

8. The computer program product of claim 5, wherein the instructions are further translatable by the computer to perform:

if the unique identifier cannot be extracted from the response to the request, denying an activity requested by the user.

9. A system for tracking social identities, comprising:

an identity database for storing social identities associated with one or more users in a first network, the one or more users having one or more user devices; and a middleware on a proxy server communicatively connected to the one or more user devices and one or more social networking platforms, the middleware being configured to perform:

extracting a unique session value from a request sent by a browser application running on a user device, the user device being associated with a user in the first network;

determining whether the unique session value contains a social identity, the social identity being a unique identifier used by a social networking platform to identify the user on the social networking platform, the social networking platform being external to the first network;

if the unique session value extracted from the request contains no social identity:
  extracting a unique identifier from a response to the request;
  associating the unique identifier from the response with the unique session value from the request; and
  updating an identity database to reflect a new social identity of the user, the new social identity referencing the unique identifier being used by the social networking platform to identify the user on the social networking platform;

if a social identity is found in the unique session value extracted from the request, comparing the social identity with a set of social identities associated with the user;

if the social identity is found to be one of the set of social identities associated with the user, applying one or more policies to an activity requested by the user, wherein the user is in a group of users in the first network and wherein the one or more policies are associated with the group of users.

10. The system according to claim 9, wherein the middleware is configured to perform:

caching a copy of the request if the unique session value extracted from the request contains no social identity; and forwarding the request to a web application on the social networking platform.

11. The system according to claim 9, wherein the middleware is configured to perform:

if the social identity is not found in the social identities stored in the identity database:
  caching a copy of the request; and
  forwarding the request to a web application on the social networking platform.

12. The system according to claim 9, wherein the middleware is configured to perform:

if the unique identifier cannot be extracted from the response to the request, denying an activity requested by the user.

* * * * *